US011146588B2

(12) United States Patent
Lee et al.

(10) Patent No.: US 11,146,588 B2
(45) Date of Patent: *Oct. 12, 2021

(54) CONTEXT-BASED ADAPTIVE ENCRYPTION

(71) Applicant: International Business Machines Corporation, Armonk, NY (US)

(72) Inventors: Cheng-Ta Lee, Taipei (TW); Chun-Shuo Lin, Tainan (TW); Wei-Shiau Suen, Taichung (TW); Ming-Hsun Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/457,942

(22) Filed: Jun. 29, 2019

(65) Prior Publication Data

US 2019/0327269 A1    Oct. 24, 2019

Related U.S. Application Data

(63) Continuation of application No. 15/879,509, filed on Jan. 25, 2018.

(51) Int. Cl.
*H04L 29/06* (2006.01)
*H04L 29/12* (2006.01)
*H04L 29/08* (2006.01)

(52) U.S. Cl.
CPC .......... *H04L 63/18* (2013.01); *H04L 61/2592* (2013.01); *H04L 63/029* (2013.01);
(Continued)

(58) Field of Classification Search
None
See application file for complete search history.

(56) References Cited

U.S. PATENT DOCUMENTS 5,802,178 A * 9/1998 Holden ............... H04L 63/0218
713/151
7,787,621 B2    8/2010 Noble et al.
(Continued)

OTHER PUBLICATIONS

Fazeen et al, "Context-Aware Multimedia Encryption in Mobile Platforms," 2014 9th Cyber and Information Security Research Conference, Apr. 2014.
(Continued)

*Primary Examiner* — Kambiz Zand
*Assistant Examiner* — Arezoo Sherkat
(74) *Attorney, Agent, or Firm* — Jeffrey S. LaBaw; David H. Judson

(57) ABSTRACT

A network-based appliance includes a mechanism to set-up and selectively use an "out-of-band" encryption channel. The mechanism comprises a packet parser, and a packet dispatcher, and it is integrated with an existing network layer stack that typically is not visible to host applications. In lieu of simply encrypting all data it receives, the mechanism instead analyzes one or more attributes, e.g., protocol type, application type, current encryption strength, content payload, etc., associated with a packet transmission to determine whether further encryption is required. The evaluation may include a deep packet inspection (DPI) when the information at the network layer (e.g., IP address, port number, etc.) is not sufficient to determine if the payload in the packet needs to be further encrypted. Based on the result of the analysis, packets are dispatched to the encryption channel as and when necessary. When additional encryption is not necessary, however, packet(s) are instead dispatched through an ordinary non-encrypted channel.

10 Claims, 7 Drawing Sheets

(52) U.S. Cl.
CPC ........ *H04L 63/0428* (2013.01); *H04L 63/164* (2013.01); *H04L 69/22* (2013.01); *H04L 63/0272* (2013.01); *H04L 63/20* (2013.01); *H04L 69/324* (2013.01); *H04L 69/325* (2013.01)

(56) References Cited

U.S. PATENT DOCUMENTS

| | | | | |
|---|---|---|---|---|
| 8,848,704 | B2* | 9/2014 | Twitchell | H04L 69/22 370/389 |
| 9,712,504 | B2 | 7/2017 | Kurmala et al. | |
| 2007/0214502 | A1* | 9/2007 | McAlister | H04L 63/08 726/15 |
| 2008/0034418 | A1* | 2/2008 | Venkatraman | H04L 63/0876 726/15 |
| 2010/0250920 | A1* | 9/2010 | Chandrika | H04L 12/4633 713/152 |
| 2016/0315920 | A1* | 10/2016 | Kurmala | H04L 63/0471 |
| 2017/0085530 | A1* | 3/2017 | Volkov | H04L 63/029 |

OTHER PUBLICATIONS

Sharma et al, "A Study on Different Approaches of Selective Encryption Technique," International Journal of Computer Science & Communication Networks, vol. 2(6), 658-662, 2012.
Ford et al, "Architectural Guidelines for Multipath TCP Development," Internet Request For Comment (RFC) 6182, Mar. 2011.
"IPSec," Wikipedia.com, Jan. 7, 2018.
"System Administrator Guide: IP Services," FIG. 19.1, Oracle, 2011.

* cited by examiner

CONTEXT-BASED ADAPTIVE ENCRYPTION

BACKGROUND OF THE INVENTION

Technical Field

This disclosure relates generally to information security, e.g., on network-connected appliances.

Background of the Related Art

Encryption has become a key requirement in a compute cloud environment, wherein all the communications between assets are required to be encrypted. An example environment is IBM® Bluemix, which uses IPSec tunneling to connect system components. Often, setting up an encrypted tunnel between virtual machines (VMs) or containers is not required for technical purposes but, rather, merely for compliance purposes, e.g., to ensure that communications between hosts are sufficiently secure so that confidential information (e.g., associated with a particular tenant) will not be leaked. A straightforward implementation that addresses the latter requirement is to simply setup an encrypted tunnel between the hosts, and then use this tunnel for all of the communications. While this approach is commonly used, it can lead to resource over-utilization, especially in the case where the host application/protocol already provides encrypted data. In particular, and because the underlying data itself is already encrypted, setting up and maintaining a further encrypted channel (namely, the IPSec tunnel through which the originally-encrypted data can then travel) leads to a waste of computational and memory resources.

There remains a need to address this "all-or-nothing" approach, wherein either all data (whether or not previously encrypted) is sent through the encrypted channel, or the encrypted channel is not used at all. The former requirement often leads to unnecessary double encryption, whereas the latter (avoiding the encrypted channel) may raise potential compliance issues.

BRIEF SUMMARY

A network-based appliance includes a mechanism to set-up and selectively use an "out-of-band" encryption channel (to a remote host). The mechanism is tightly-integrated with an existing network layer stack, which typically is not visible to host applications operating in the appliance. As a result, the mechanism operates transparently to the applications. In lieu of simply encrypting all data it receives (whether or not previously encrypted) and then blindly sending it over the channel, the mechanism instead analyzes the "context" of the transmission, and it then makes an informed determination regarding whether additional encryption is even required. To this end, and before sending out network packets, the mechanism applies a packet parser to determine whether the data packet needs further encryption. Preferably, the parser bases its determination on one or more attributes or conditions, e.g., protocol type, application type, current encryption strength, content payload, and combinations thereof. The evaluation by the packet parser also may involve a deep packet inspection (DPI) when the information at the network layer (e.g., IP address, port number, etc.) is not sufficient to determine if the payload in the packet needs to be encrypted. Based on the result of the analysis by the packet parser, a packet dispatcher in the mechanism dispatches packets to the encryption channel as and when necessary. When additional encryption is not necessary, however, the packet dispatcher dispatches the packet(s) instead through an ordinary non-encrypted channel.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION OF AN ILLUSTRATIVE EMBODIMENT

Figure 1:
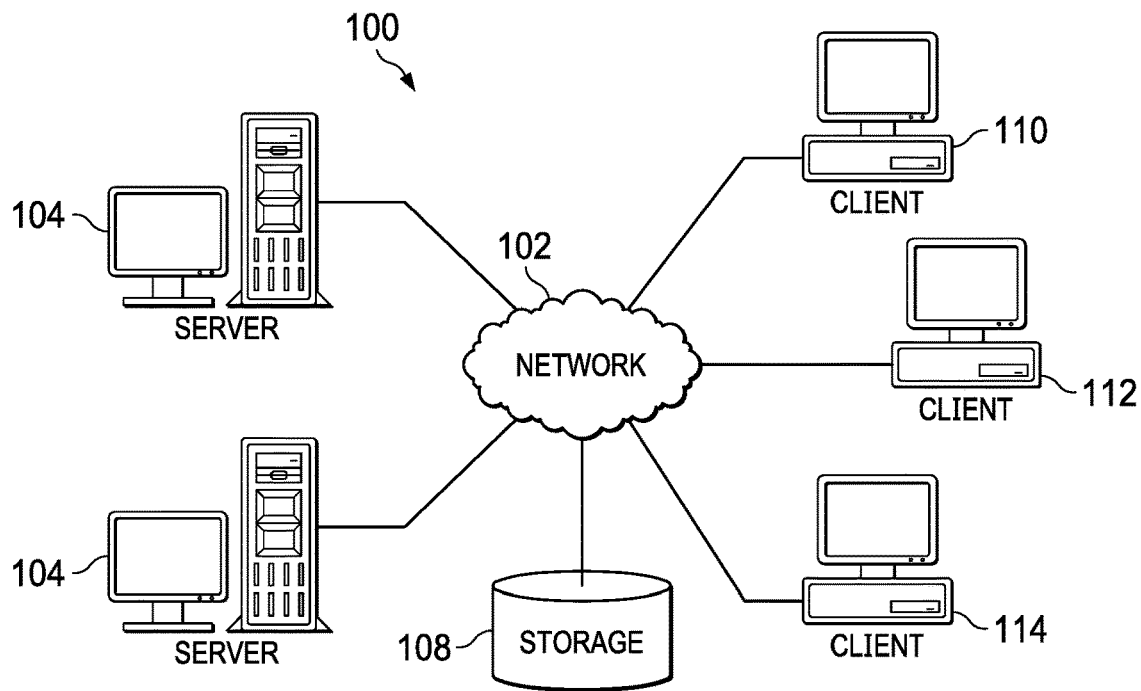
FIG. 1 depicts an exemplary block diagram of a distributed data processing environment in which exemplary aspects of the illustrative embodiments may be implemented.
Figure 2:
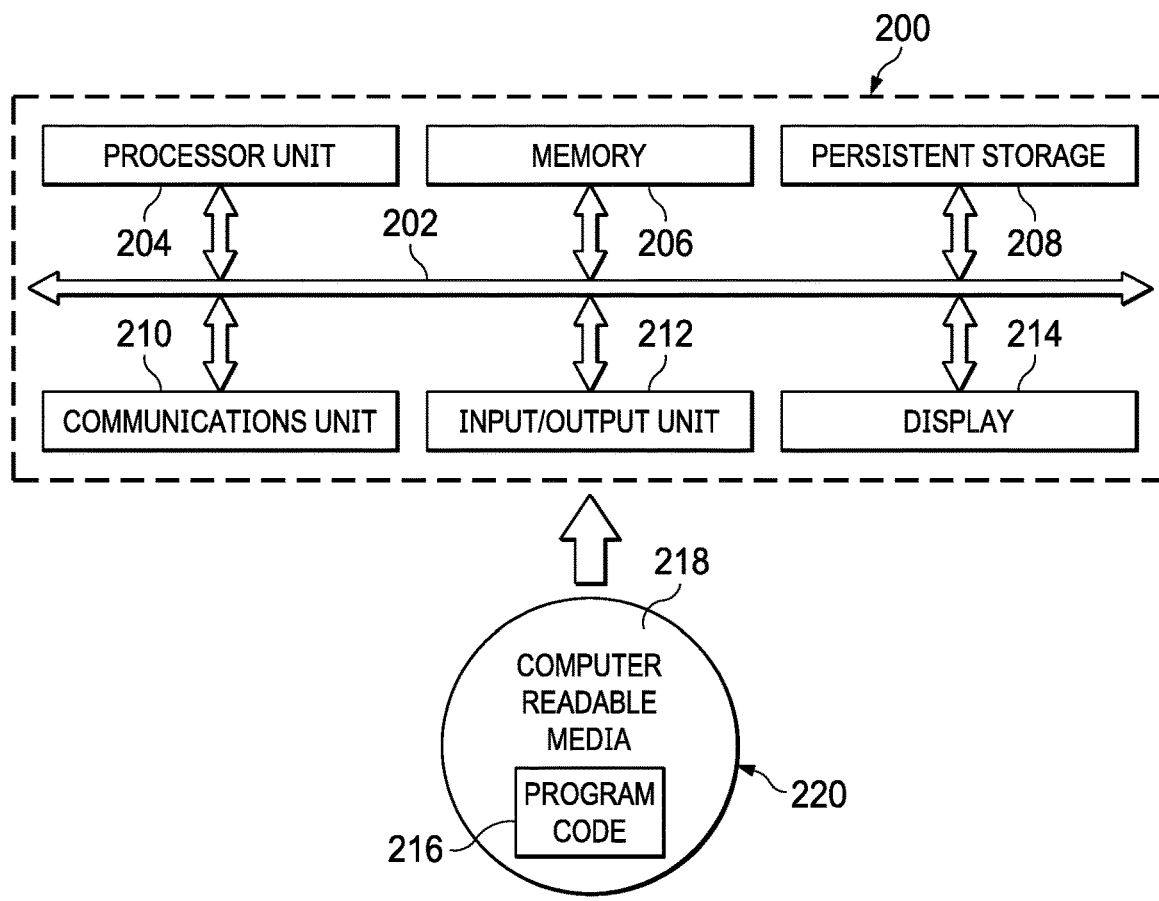
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

Client-Server Technologies

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As further background, Secure Sockets Layer/Transport Layer Security (SSL/TLS) is a well-known cryptographic protocol that is used to secure communications over networks such as the Internet. Cryptographic protocols such as SSL/TLS are often based on public key cryptographic systems, such as the RSA (Rivest, Shamir and Adelman) encryption algorithm. For a traditional RSA-based SSL session, the two sides of a connection agree upon a "premaster secret" (PMS) which is used to generate the parameters for the remainder of the session. Typically, the two sides use RSA asymmetric encryption to establish the pre-master secret without exchanging the actual value in plaintext. In operation, the SSL client generates the pre-master secret and encrypts it with the SSL server's publicly available RSA key. This generates an encrypted pre-master secret (ePMS), which is then provided to the SSL server. The SSL server has a private decryption key, which is then used to decrypt the encrypted pre-master secret. At this point, both the client and the server have the original pre-master secret and can use it to generate the symmetric key used for actual encrypted and secure data exchange.

Encrypted traffic on the web occurs by a chain of trust. Each web server has a certificate that it presents to each client (usually a web browser) to indicate that they are who they say they are. Web servers often get these certificates from an authority (a Certificate Authority, or CA) that can vouch for the legitimacy of the web server. The server's certificate indicates the authority from which the certificate was obtained (the "issuer"). Web browsers typically have a list of issuers that they trust. When a web browser is presented with a certificate from a web server, the browser will check the issuer and match it against its trusted list. If a match is found, the connection will continue; if a match is not found, the browser usually will present a warning and perhaps reject the connection. A CA is not necessarily a special entity other than the fact that it is trusted. Any entity can set itself up to trust, or sign, certificates. A certificate can trust itself, which is referred to as a self-signed certificate. To interoperate with a client using SSL/TLS, it is necessary to create certificates that the client will implicitly trust. With respect to a network appliance (as described below), it is presumed that an administrator can configure enterprise clients to trust the appliance to sign certificates. In effect, the issuer of the appliance then is on the browser's list of trusted issuers.

Network-Connected Secure Appliances

A network appliance typically is a rack-mounted device. The device includes physical security that enables the appliance to serve as a secure vault for sensitive information. Typically, the appliance is manufactured, pre-loaded with software, and then deployed within or in association with an enterprise or other network operating environment; alternatively, the box may be positioned locally and then provisioned with standard or customized middleware virtual images that can be securely deployed and managed, e.g., within a private or an on premise cloud computing environment. The appliance may include hardware and firmware cryptographic support, possibly to encrypt data on hard disk. No users, including administrative users, can access any data on physical disk. In particular, preferably the operating system (e.g., Linux) locks down the root account and does not provide a command shell, and the user does not have file system access. Typically, the appliance does not include a display device, a CD or other optical drive, or any USB, Firewire or other ports to enable devices to be connected thereto. It is designed to be a sealed and secure environment with limited accessibility and then only be authenticated and authorized individuals.

Figure 3:
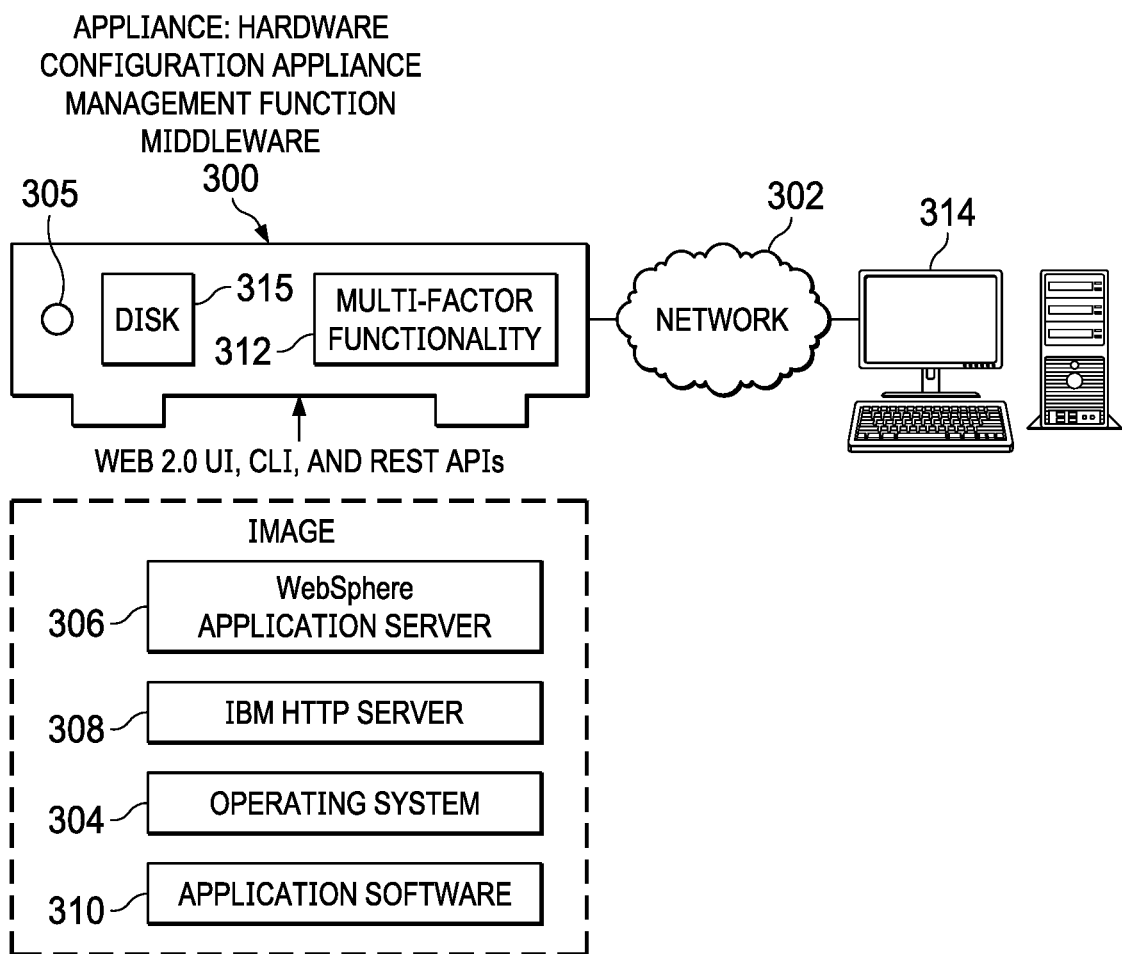
FIG. 3 illustrates an exemplary network-based secure appliance in which the disclosed subject matter may be implemented.

Referring to FIG. 3, a representative operating environment includes the physical appliance 300, which interfaces to a network 302. The appliance may be implemented using a data processing system such as described above with respect to FIG. 2, and it may represent one of the servers (or clients) shown in FIG. 1. Typically, the appliance 300 includes a Web 2.0-based user interface (UI), a command line interface (CLI), and REST-based application programming interfaces (APIs). In this example, the appliance has been provisioned with an image comprising an operating system 304, an application server 306, an HTTP server 308, and other application programs 310. Additional software solutions (not shown) may be included within the image. These software elements may come pre-loaded on the appliance, which may include other data (e.g., templates, scripts, files, etc.). The particular software configuration of course will depend on the use being made of the appliance. The appliance includes one of more storage devices (e.g., disk 315). The type and number of storage devices may vary.

Interception, Decryption and Inspection of Secure Network Communications

Figure 4:
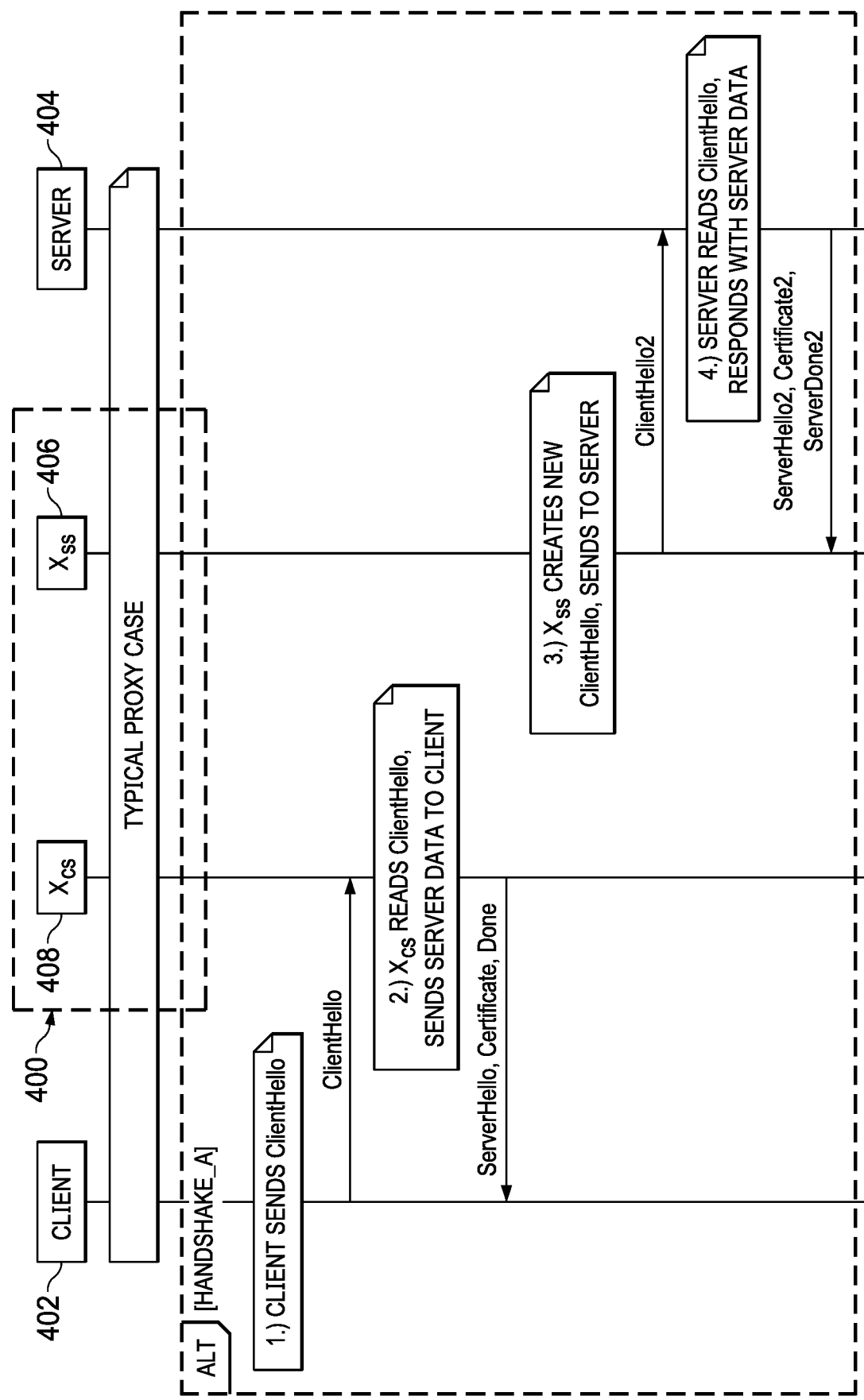
FIG. 4 illustrates how a conventional SSL/TLS communication is processed in a man-in-the-middle appliance to facilitate inspection of secure traffic.

By way of further background, FIG. 4 illustrates the basic operation of a known man-in-the-middle (MITM) device 400 for intercepting, decrypting and inspecting secure network communications according to a known technique. The device is implemented within a secure network appliance such as described above and illustrated in FIG. 3. More generally, the device is a computing system such as shown in FIG. 1.

As illustrated, the device 400 is connected between a client 402 and a server 404. The client and server are provisioned to secure communications using SSL or TLS. Familiarity with SSL/TLS is presumed. In this embodiment, the device 400 provides a transparent (or man-in-the-middle) proxy between the client 402 and the server 404 by creating and managing two (2) separate SSL/TLS sessions, one as a client process $X_{ss}$ 406 to the target server 404, and another as a server process $X_{cs}$ 408 to the initiating client 402. The $X_{ss}$ and $X_{cs}$ components are sometimes referred to herein as SSL instances, where an SSL instance typically is a piece of code that makes up an SSL session. An SSL session (or session context) is the communication itself that occurs between two endpoints. The intermediate proxy 400 thus appears to the server 404 as a client, and to the client 402 as the intended server. Communications initiated from the client 402, and any responses received from the server 404, are then available for inspection (or other processing, such as rewrite) and subsequent action. To that end, the device 400 may include a protocol analysis module (e.g., IBM Security Network Protection PAM), which provides a Deep Packet Inspection (DPI) function to identify and possibly mitigate network threats. Other packet inspection applications may be supported.

In operation, and as seen in FIG. 4, following an initial TCP handshake (not shown), the client 402 generates the SSL/TLS session initiation request (the Client Hello) to begin the SSL/TLS handshake to the server. This is step 1. The proxy intercepts this connection and directs it to the client-facing server component $X_{cs}$ 408. At step 2, the Xcs component reads the client hello, interprets the data, and responds to the client 402, typically with a server hello, a certificate, and a server done message. In step 3, a brand new SSL connection is configured and setup inside the appliance. This is a server-facing connection that is initiated by the $X_{ss}$. The $X_{ss}$ then generates a new client hello (referred to here as ClientHello2 to distinguish it from the ClientHello in step 1), and sends the (new) client hello to the server. In step 4, the server 404 reads the new client hello and responds with ServerHello2, Certificate2 and ServerDone2. These messages are yet again distinct from the messages issued by $X_{cs}$ to the client in step 2. As a result, there are two (2) distinct connections, one between the client 402 and $X_{cs}$ 408, and the other between $X_{ss}$ 406 and the server 404. At this point, if the MITM processing (e.g., by the PAM or other application) determines that this is not a (client-server) connection is desired to be inspected, the system either must continue to inspect the connection (perhaps ignoring the results), or shut it down entirely. The determination may be based in any convenient manner, e.g., by performing a policy-based rule match against information in the certificate received from the server (Certificate2 above).

Context-Based Adaptive Encryption

With the above as background, an approach to "context-based adaptive encryption" according to this disclosure is now described. A representative implementation is in a smart VPN client, in other software running on a host doing DPI, in a commercial product, such as IBM® QRadar® Network Security (XGS) (formerly known as IBM Security Network Protection (XGS)), a next-generation intrusion prevention system (IPS) that includes DPI functionality, or the like. These examples are not intended to be limiting, as the approach may be carried out in any device, appliance, product or system.

According to this disclosure, a device of this type includes a context-based adaptive encryption mechanism to set-up and selectively use an "out-of-band" encryption channel to a remote host that also includes a similar type mechanism. As will be described in more detail below, preferably the mechanism comprises a packet parser, and a packet dispatcher, and it is tightly integrated with an existing network layer stack that typically is not visible to host applications that are executing on the appliance. In lieu of simply encrypting all data it receives, the packet parser in the mechanism instead analyzes one or more attributes, e.g., protocol type, application type, current encryption strength, content payload, etc., associated with a packet transmission to determine whether encryption is even required. The determination may be based on one or more policies, such as a compliance policy (requiring that all communications be encrypted to secure confidential information), or other security policy. As will be further described, the evaluation typically also includes a deep packet inspection (DPI), especially when the information at the network layer (e.g., IP address, port number, etc.) is not sufficient to determine if the payload in the packet needs to be further encrypted. Based on the result of the analysis, packets are dispatched to the encryption channel by the packet dispatcher as and when necessary. When additional encryption is not necessary, however, packet(s) are instead dispatched by the packet dispatcher through an ordinary non-encrypted channel.

Figure 5:
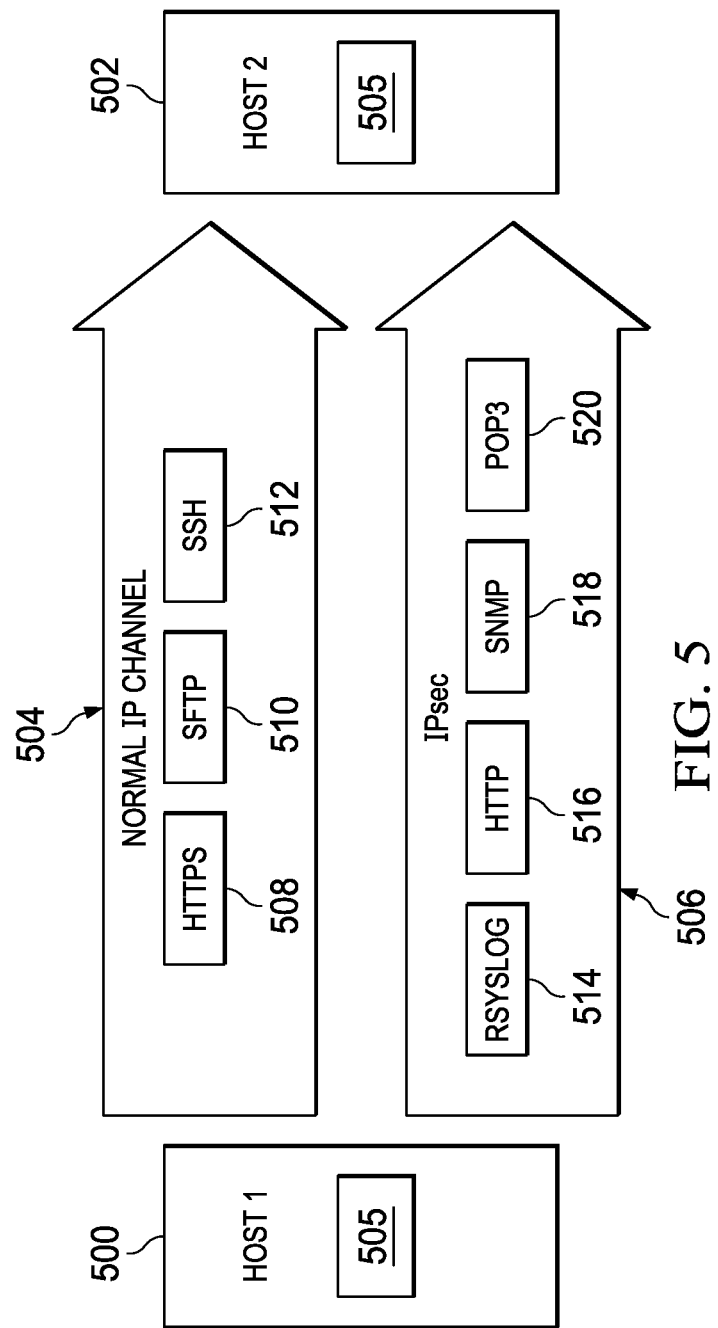
FIG. 5 illustrates how a pair of hosts establish both normal and encrypted channels to facilitate a context-based adaptive encryption technique of this disclosure.

FIG. 5 depicts the basic technique of this disclosure. In this example, which is merely representative, there are two hosts 500 and 502. A typical host is implemented as described in FIG. 2. Each host executes one or more applications and/or protocols that send and receive data packets between them, all in a well-known manner. In this operating scenario, it is assumed that, as a compliance or other security requirement, the communications between the hosts are to be secured, typically by encryption. To this end, but in lieu of simply establishing an encryption tunnel (e.g., an IPSec tunnel) through which all traffic then passes, the hosts 500 and 502 each includes a mechanism 505 that is used to intelligently manage these transmissions over a pair of channels 504 and 506. As will be described below, each mechanism 505 acts as a "Smart Connection Encryptor" (SCE). Channel 504 is a "normal" Internet Protocol (IP) channel, while channel 506 is an encrypted channel (e.g., an IPSec tunnel). According to an aspect of this disclosure, the SCE preferably is tightly-integrated with the host's network stack, and (together with a similar device on the other host) operates as a host-to-host Virtual Private Network (VPN) in that it establishes the encrypted channel 506 to the other host when there is payload that needs to be encrypted. From a logical perspective, the SCE in effect then "owns" and controls both the physical network interface (i.e., the NIC) to the normal IP channel 504, as well as to the tunnel (channel 506). Each packet sent through the physical NIC is delivered untouched, while every packet sent through the tunnel is encrypted.

Thus, for example, and as shown in FIG. 5, applications that use protocols such as HTTPS 508, SFTP 510 and SSH 512 for their transport have their data are delivered (as clear text traffic) through the normal IP channel 504, whereas applications that use protocols such as Rsyslog 514, HTTP 516, SNMP 518 and POP3 520 for transport are delivered through the encryption channel 506. These are merely representative examples, and many variants are possible. Further, there may be scenarios where a particular protocol that already uses encryption still requires additional encryption (e.g., because the cipher used is too weak to meet a compliance requirement).

Figure 6:
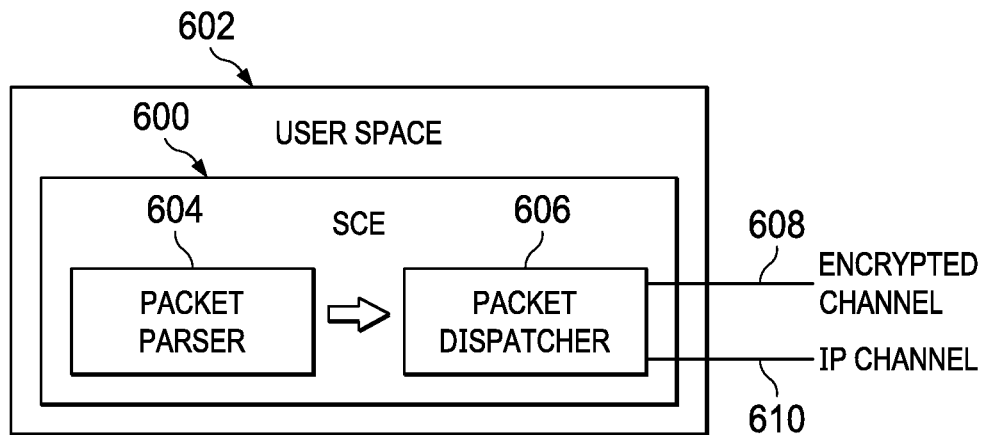
FIG. 6 depicts an implementation of a Smart Connection Encryptor (SCE) component according to this disclosure.

Turning now to FIG. 6, a basic architecture of the SCE 600 in one example embodiment is depicted. In this embodiment, the SCE is implemented (e.g., as a VPN client) in user space 602 in the host. As such, the SCE has the ability to receive each data packet, analyze it (as will be described below), and selectively modify a route table on the host to deliver the packet through the encryption tunnel, but only as and when necessary. To this end, the SCE comprises two (2) basic operating components, a packet parser 604, and a packet dispatcher 606. Typically, these components are implemented as software (a set of computer program instructions), and their functions may be separate or combined. The packet parser 604 determines if a particular packet (or stream of data packets as the case may be) needs to be encrypted for delivery of the encryption channel. According to this disclosure, the "context" of the transmission is analyzed by the packet parser to make this determination. This determination preferably is based on one or more attributes or conditions including, without limitation, protocol type, application type, strength of current encryption, content in payload, and so forth. FIG. 5 depicts how the "protocol type" is used to determine which data packets are transported via the encryption channel, but the "context" evaluated by the packet parser preferably includes these additional characteristics.

Protocol type analysis is desirable because many protocols (e.g., HTTP, FTP, SMTP, etc.) do not provide any native encryption themselves. Thus, when the packet parser sees that the application(s) is using these packets, and when it other determines (based on the context) that encryption is necessary or desirable, it can then deliver the associated packets through the encrypted channel.

Application type analysis is desirable because security requirements of applications vary significantly. Thus, for example, when the content is delivered from or to a content delivery network that is publicly-accessible, there may also be encryption applied and thus no need to send the payload through the encrypted channel. In other scenarios, however, the application type may dictate that the further encryption is still necessary.

Current encryption strength analysis is desirable because, as noted above, while the payload of a data packet may already by encrypted, the encryption strength does not meet a security requirement. For example, an HTTPS connection might use a weak cipher that does not comply with a particular standard (e.g., FIPS-140). Thus, the packet parser may determine a need to re-encrypt the payload to fulfill the more stringent security requirement.

Payload content analysis is desirable because often the contents of the packet can be a determining factor as to whether encryption (or further encryption) should be applied. A simple example is when the payload contains a credit card number. Packet content analysis typically leverage the Deep Packet Inspection (DPI) capabilities that are available in the device in which the functionality is implemented. DPI may also be required when the information at the network layer (e.g., IP address, port number, etc.) is not sufficient to determine if the payload in the packet needs encryption. Thus, preferably the payload content analysis uses DPI during the packet parsing. The payload content analysis using DPI inspection may identify other user attributes, such as user identity, that are then evaluated for compliance with a particular security policy. Thus, for example, there may be a rule established that when a user is transmitting a PDF file, it must go through an encrypted channel. The payload content analysis may provide for more fine-grained control, e.g., a rule that specifies that when a user is transmitting a file to his or her identified supervisor it must go through the encrypted channel, or a rule that specifies that when a user transmits a PDF file containing sensitive data, it must go through the encrypted channel, and so forth. Another example rule might be that when a user is accessing a high value asset (e.g., a payroll system, a source control server, etc.) it must go through an encrypted channel. Of course, these are merely representative examples.

Thus, as used herein, the notion of "context" in this approach preferably analyzes one or more of the following: a protocol type, an application type, an encryption strength, and contents of a payload of the data packet, or combinations thereof, with the payload content(s) being as determined by the applicable DPI functionality. As noted above, the deep packet inspection itself may evaluate more fine-grained attributes including, information type, source or target identity, one or more sensitivity classifications, and so forth. In this case of payload content analysis, the manner by which the context is determined typically depends on the type of DPI function implemented. Other characteristics (e.g., protocol type, application type, encryption strength, etc.) may be determined be simple request flow attributes, using a configuration file, network layer flow analysis, or the like. A particular context-based security policy enforced by the SCE packet parser may be implemented using eXtensible Access Control Markup Language, or XACML. An XACML policy consists of a policy set and a policy combining algorithm. A policy set is a sequence of policies or policy sets, and a target, and a policy is a target, a rule set, and a rule combining algorithm. A target specifies the type of requests to which the policy or policy are applied. Only if a request satisfies the target of a policy is the request then checked against the policy rule set. A rule set is a set of rules, and a rule has a target, an optional condition and an effect (e.g., permit or deny). The rule target specifies whether the rule is applicable to the request. If a request matches the target and any condition of a rule, the effect is returned as a decision. XACML provides for several rule or policy combining algorithms including, without limitation: first-applicable, only-one-applicable, deny-overrides, and permit-overrides. XACML access control works by evaluating an XACML request (containing an authenticated subject, the resource being accessed, and the action being performed) with one or more XACML-based access control policies, and returning an XACML response permitting or denying the requested access. Using DPI, the SCE obtains the relevant data (e.g., user identity, role, etc.) needed, and then enforces the policy according to the applicable policy rules.

The policy evaluation may be implemented with any request-response protocol and with other API mechanisms than the XACML-based versions explained above. Thus, for example, a context-based security policy may also be scoped and enforced by the SCE using other known mechanisms, such as those based on eXtensible rights Markup Language (XrML), Enterprise Privacy Authorization Language (EPAL), and the like.

Figure 7:
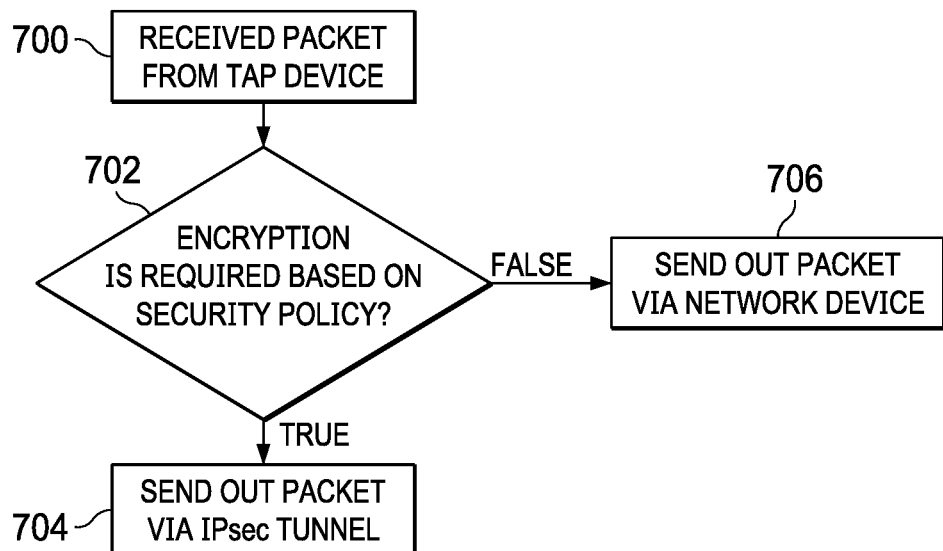
FIG. 7 depicts a process flow implemented by the SCE component.

Referring now back to FIG. 6, the packet dispatcher 606 dispatches packets to the encryption channel 608 or through the ordinary non-encrypted channel 610 according to the analysis result from the packet parser 604. Preferably, this analysis and dispatch are carried out on a packet-by-packet basis, or on a packet stream-by-packet stream basis, wherein a packet stream comprises a plurality of data packets. FIG. 7 depicts the basic process flow for the packet-by-packet analysis. The process begins at step 700 by receiving a packet (e.g., from a tap device). At step 702, a test is performed by the packet parser to determine if encryption is required based on a security policy. As noted above, this evaluation may be based on many attributes including, without limitation, protocol type, application type, current encryption strength, payload content, If the result of the test at step 702 is true, then at step 704 the packet is delivered via the encryption (e.g., IPSec) tunnel. If, on the other hand, the result of the test at step 704 is false, then at step 706 the packet is delivered out via the normal network device. This completes the processing.

Figure 8:
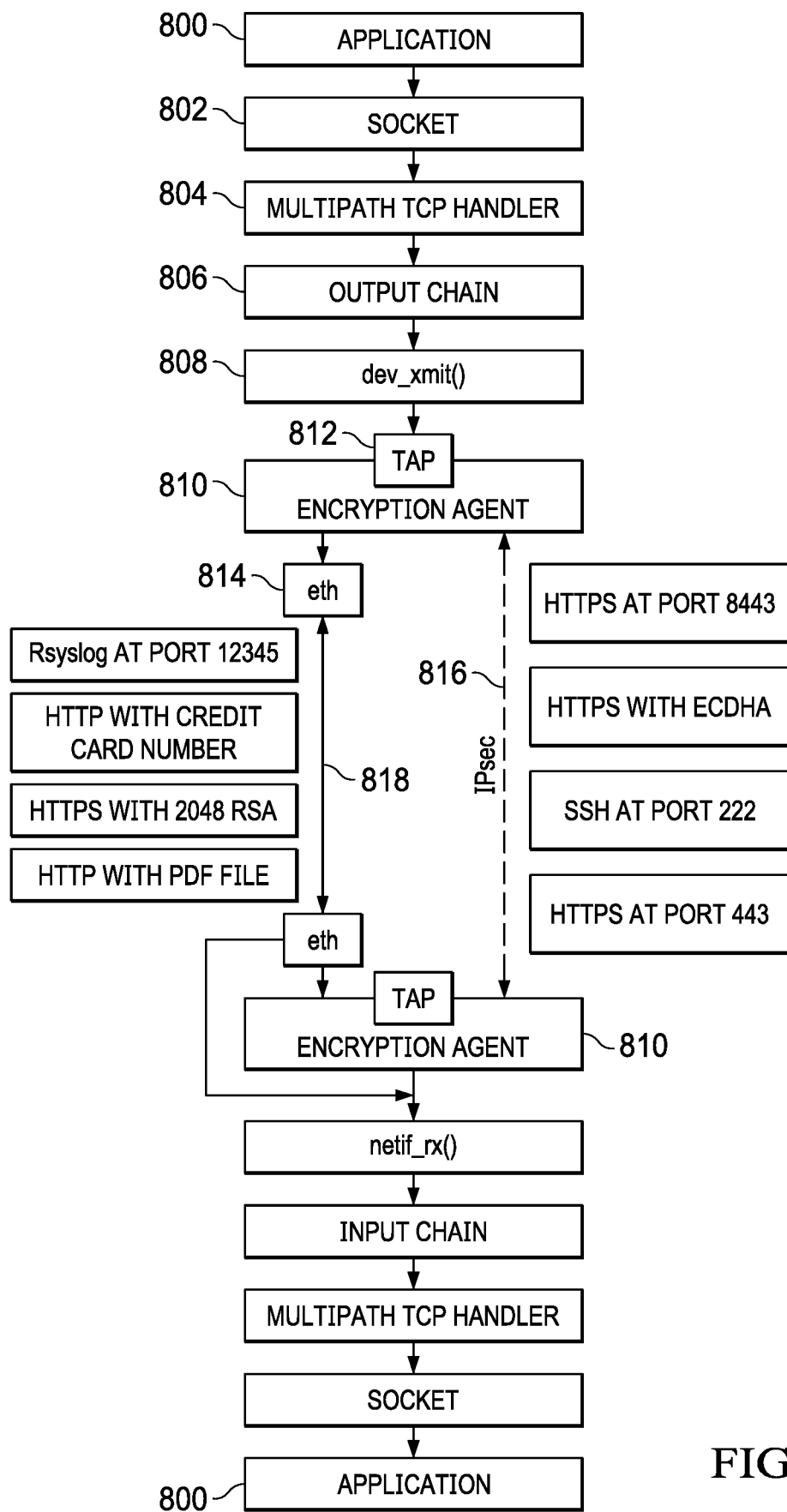
FIG. 8 depicts how the SCE component is integrated into a host network layer to facilitate establishment of a host-to-host encryption channel for selectively delivery of packets requiring a level of encryption to meet a compliance requirement according to this disclosure.

Referring now to FIG. 8, a preferred implementation of this technique is depicted and explained. As shown, the host on each side of the host-to-host communication comprises an application 800 and a conventional TCP/IP network layer stack comprising socket 802, a multipath TCP handler 804, an output chain 806, and a transmit function (dev xmit 0) 808. As depicted, the SCE is depicted as the encryption agent 810, which as noted above includes the packet parser and packet dispatcher components. Packets are obtained from the network layer by network tap 812, also in a known manner. As shown, the SCE encryption agent is tightly-integrated with the network layer via the network tap 812, and the Network Interface Card (NIC "eth") 814. The remote side of the host-to-host communication includes similar functionality. Thus, two physical (and logical) channels are established, namely, the encrypted channel (e.g., an IPSec tunnel) 816 located between the encryption agents 810 themselves, and the ordinary non-encrypted channel 818 located between the network interfaces 814. The encrypted channel may be considered to be "out-of-band" because it is at the network layer, which is not visible to most applications; in this manner, it acts as a separate dedicated channel for managing packet transmissions between the hosts or their applications/protocols (the channel endpoints). When the encryption agent 810 determines (via its packet parser, as described in the process flow in FIG. 7) that packets should be delivered over the encrypted channel, the packet(s) are delivered via encryption channel 816. When the encryption agent 810 determines that packets need not be delivered in this manner, the packets are dropped onto the normal network interfaces and delivered untouched via channel 818.

Figure 9:
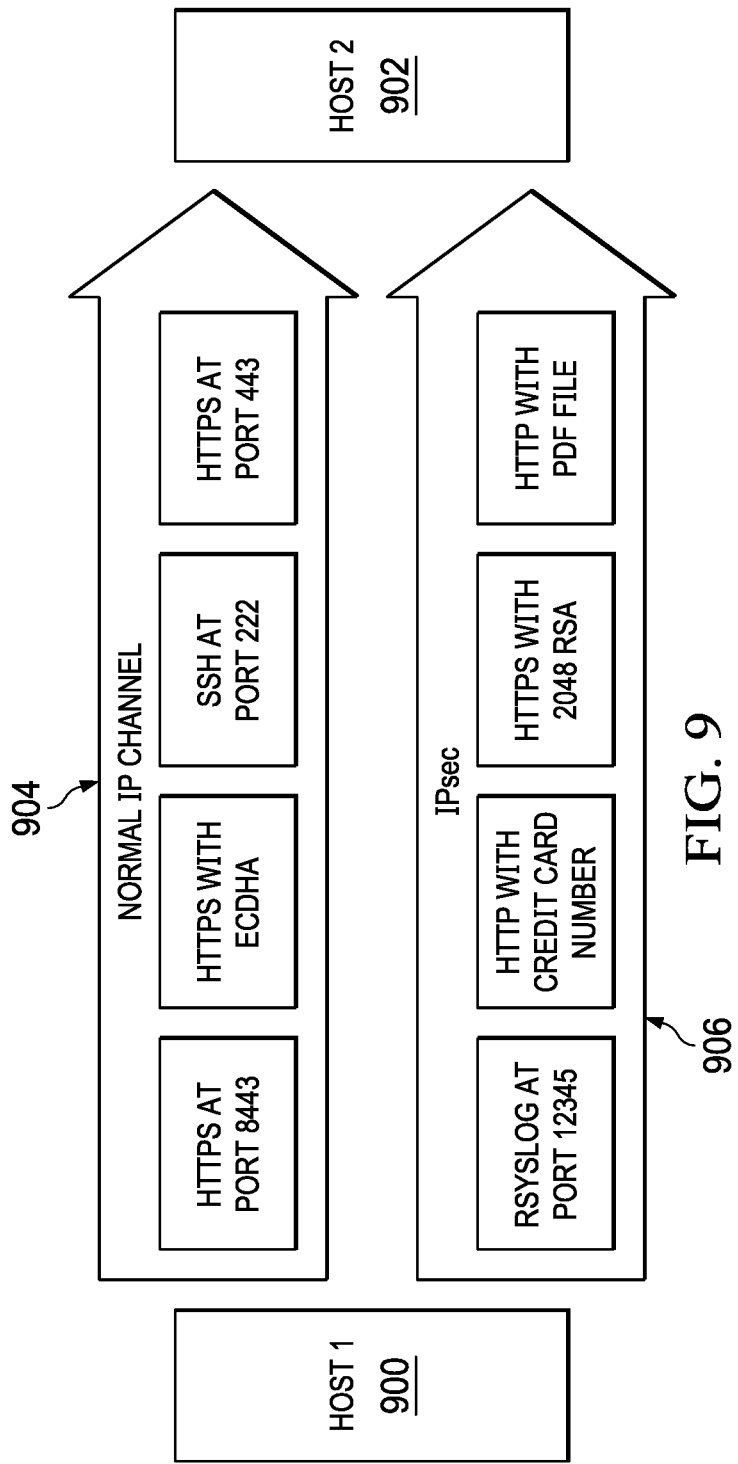
FIG. 9 depicts how the out-of-band encryption channel is utilized to provide context-based adaptive encryption according to this disclosure.

In this manner, the encryption agent at each side of the connection provide an intelligent (informed) decision regarding whether to selectively encrypt and deliver the packet through the encryption channel. As such, and based on packet analysis, one or more packets in a packet stream are delivered via the encrypted channel 816, and one or more other packets in the packet stream are delivered via the non-encrypted ordinary channel 818. FIG. 9 depicts a representative implementation of applying this context-based adaptive encryption technique.

While the above description refers to the encrypted channel as being out-of-band, this is not intended to be limiting. In certain instances, it may be desired that the encrypted channel is normally used and that the non-encrypted channel be used as the alternative. Thus, which channel is considered to be the default preferably is configurable.

The technique of this disclosure provides significant advantages. In particular, the approach of selectively sending packets through the encrypted channel provides significant processing and memory efficiencies, primarily because it avoids unnecessary double encryption of data that can otherwise tax these computational resources. Because the functionality as described is tightly-integrated to the host's network stack, it is carried out transparently to the sending or receiving application Importantly, the approach works for all data being transported, irrespective of the compliance requirements, and whether the DPI itself is capable of determining definitively whether sensitive data is in the traffic. It enables protection of all data with sufficient encryption levels, but without requiring full encryption between computing hosts to meet a compliance requirement. The approach herein significant reduces computational overhead while still enabling a policy requirement to be met. The technique takes advantage of existing DPI technologies, which enable the SCE to understand the context in the payload and then apply the encryption selectively.

In a variant embodiment, a particular host may establish SCE-based host-to-host communications with multiple other hosts.

In another variant embodiment, and in lieu of implementing the SCE entirely in user space, the functionality may be implemented in part in host kernel space (namely, in the operating system (OS)), e.g., as a kernel module. One possible implementation is to modify an existing IPSec protocol implementation to perform the packet parsing and analysis in kernel space, and then to setup a channel to provide the result to the packet dispatcher running in user space.

In another variant, the SCE packet parsing and dispatcher may leverage existing appliance functionality. Thus, for example, the DPI module in the appliance may be modified to include the packet parser.

As still another variant, it is not required that the encrypted channel be established in advance or that it be maintained persistently. An alternative is to established the channel "on-demand" with respect to a particular packet or packet stream. Further, a particular channel may be established selectively based on the type or requirements of the security policy. Thus, the encrypted channel functionality, whether persistent or on-demand, may be selectively applied based on one or more aspects of the security policy.

A further variant is to apply the above-described functionality based on other contextual factors, such as time-of-day, client IP address, source destination, source or target resource identification, a determination that a network attack may be underway, or the like.

While the techniques have been described in the context of a network-based appliance (whether physical or virtual), this is not a limitation. The appliance is not limited to any particular type. The above-described operation may likewise be used in association with any known technique or mechanism that itself is used to intercept, decrypt, inspect, modify, rewrite and re-encrypt data from any machine, irrespective of the machine's physical or virtual configuration. Generalizing, the processing described herein may be carried in any intermediary positioned between client and server. In one such embodiment, and as described, the intermediary provides transparent inline content inspection and modification. The client and server are computing entities (endpoints). Thus, the intermediary may be configured as a physical device, a virtual device, or some combination thereof. It can be used for a number of different applications including, without limitation, the decrypting of encrypted (SSL/TLS) sessions so that security inspection can be performed in the manner previously described.

Representative other types of devices in which the subject matter herein may be implemented include, without limitation, VPN client/server, reverse SSL/TLS proxies, reverse HTTPS proxies, SSL decryptors, and IPS.

While a preferred operating environment and use case (a secure appliance) has been described, the techniques herein may be used in any other operating environment in which it is desired to intercept, decrypt, inspect and/or modify (re-write) network traffic to and/or from a computing system or device.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various client-side architectures (e.g., firewalls, NAT devices), and in or in conjunction with various server-side architectures including simple n-tier architectures, web portals, federated systems, and the like.

As noted, a typical implementation may be a cloud computing environment in which one or more hosts are system components (in the cloud) that communicate securely with one another in accordance with some cloud-based security or other compliance policy.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, Having described our invention, what we claim is as follows:

1. A method of context-based adaptive encryption between a pair of applications executing in a network environment, comprising:
   at a host on which a first application of the pair executes:
   configuring a tap between a network stack and a network interface of the host;
   tapping a data packet between the network stack and the network interface;
   parsing the data packet tapped to determine whether encryption of the data packet is required, wherein a determination is based on evaluating whether a security policy requirement is met, wherein an evaluation of the security policy is based on one of: a protocol type, an application type, a current encryption strength, and contents of a payload of the data packet;
   upon a determination that encryption of the data packet is required based on the evaluation that the security policy requirement is not met, selectively modifying a route table on the host to route the data packet over a first channel that incorporates an encryption layer that satisfies the security policy requirement; and
   upon a determination that encryption of the data packet is not required based on the evaluation that the security policy requirement is met, forwarding the data packet on to the network interface, the network interface providing access to a second channel over which the data packet is delivered as is it the data packet is received from the network stack.

2. The method as described in claim 1 further including establishing the first channel between the host on which the first application executes, and another host on which a second application of the pair executes.

3. The method as described in claim 2 wherein the first channel is an Internet Protocol Security (IPSec) tunnel.

4. The method as described in claim 1 wherein the contents of the payload of the data packet are identified by a deep packet inspection.

5. The method as described in claim 1 wherein the data packet is parsed in one of: a host user space, and a host kernel space.

6. The method as described in claim 1 wherein the data packet is delivered in the clear as an unencrypted packet over the second channel.

7. The method as described in claim 1 wherein the data packet is received from the first application or in accordance with a protocol that encrypts contents of the data packet prior to its delivery to the network stack.

8. The method as described in claim 1 wherein the security policy requirement is specified in an access control markup language.

9. The method as described in claim 1 wherein the contents of the payload of the data packet are evaluated against an attribute that is one of: information type, source or target identity, and a sensitivity classification.

10. The method as described in claim 1 wherein the tap is configured between a network stack transmit function and a network interface card of the host.

* * * * *